US012565036B2

(12) United States Patent
Watanabe

(10) Patent No.: US 12,565,036 B2
(45) Date of Patent: Mar. 3, 2026

(54) LIQUID EJECTING APPARATUS AND LIQUID EJECTION METHOD

(71) Applicant: SEIKO EPSON CORPORATION, Tokyo (JP)

(72) Inventor: Shunsuke Watanabe, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 217 days.

(21) Appl. No.: 18/342,950

(22) Filed: Jun. 28, 2023

(65) Prior Publication Data

US 2024/0001668 A1 Jan. 4, 2024

(30) Foreign Application Priority Data

Jun. 29, 2022 (JP) ................................ 2022-104254

(51) Int. Cl.
*B41J 2/045* (2006.01)
*B41J 2/145* (2006.01)

(52) U.S. Cl.
CPC ........... *B41J 2/04501* (2013.01); *B41J 2/145* (2013.01)

(58) Field of Classification Search
CPC ....................................................... B41J 2/145
See application file for complete search history.

(56) References Cited

U.S. PATENT DOCUMENTS 7,726,761 B2 * 6/2010 Ishida ...................... B41J 29/38 347/12
2005/0270317 A1 * 12/2005 Gao .................... B41J 2/16579 347/8
2008/0143767 A1 6/2008 Ochiai et al.
2008/0309700 A1 * 12/2008 Fukasawa ............. B41J 2/2103 347/15
2010/0039466 A1 * 2/2010 Takahashi ................. B41J 2/15 347/12
2020/0247164 A1 * 8/2020 Honda .................. B41J 2/2142

FOREIGN PATENT DOCUMENTS

JP 2008-168629 A 7/2008

* cited by examiner

*Primary Examiner* — Shelby L Fidler
(74) *Attorney, Agent, or Firm* — Harness, Dickey & Pierce, P.L.C.

(57) ABSTRACT a controller controls ejection operations such that the number of ejection operations of the first nozzle is larger than the number of ejection operations of the second nozzle and the number of ejection operations of the fourth nozzle is larger than the number of ejection operations of the third nozzle.

7 Claims, 8 Drawing Sheets

| | | | | | | | | | |
|---|---|---|---|---|---|---|---|---|---|
| FIFTH EMBODIMENT | 1ST ROW | A1 | A2 | A1 | A3 | A1 | A2 | A1 | A3 ~DA |
| | 2ND ROW | A1 | A3 | A2 | A3 | A1 | A3 | A2 | A3 |
| | 3RD ROW | A2 | A1 | A2 | A3 | A2 | A1 | A2 | A3 |
| | | | | | | | | | → +X |
| SIXTH EMBODIMENT | 1ST ROW | A1 | A1 | A1 | A3 | A1 | A1 | A1 | A3 ~DA |
| | 2ND ROW | A1 | A3 | A3 | A3 | A1 | A3 | A3 | A3 |
| | 3RD ROW | A1 | A1 | A1 | A3 | A1 | A1 | A1 | A3 |
| | | | | | | | | | → +X |

LIQUID EJECTING APPARATUS AND LIQUID EJECTION METHOD

The present application is based on, and claims priority from JP Application Serial Number 2022-104254, filed Jun. 29, 2022, the disclosure of which is hereby incorporated by reference herein in its entirety.

BACKGROUND

1. Technical Field

The present disclosure relates to a liquid ejecting apparatus and a liquid ejection method.

2. Related Art

Image formation technology in which different nozzles share the task of forming dots on the same raster line to make variations in the landing positions of ink ejected from nozzles less visible (for example, JP-A-2008-168629 is an example of the related art) is known. Accordingly, it is conceivable to set the number of ejection operations to be equal among the nozzles when a plurality of nozzles share the task.

However, when the number of ejection operations is equal among a plurality of nozzles that eject ink on the same raster line, image quality can degrade in some cases.

SUMMARY

One aspect of the present disclosure provides a liquid ejecting apparatus. The liquid ejecting apparatus includes: a head unit including a first nozzle column including a plurality of nozzles aligned in a first direction, and a second nozzle column including a plurality of nozzles aligned in the first direction, the second nozzle column being located at a position away from the first nozzle column in a second direction intersecting the first direction, each nozzle of the first nozzle column being located at the same position in the first direction as the corresponding one of the nozzles of the second nozzle column; and a controller configured to control ejection operations of the head unit, and when a nozzle included in the first nozzle column is defined as a first nozzle, the nozzle included in the second nozzle column and located at the same position in the first direction as the first nozzle is defined as a second nozzle, a nozzle included in the first nozzle column and located at a position different in the first direction from the position of the first nozzle is defined as a third nozzle, and the nozzle included in the second nozzle column and located at the same position in the first direction as the third nozzle is defined as a fourth nozzle, the controller controls the ejection operations such that the number of ejection operations of the first nozzle is larger than the number of ejection operations of the second nozzle and the number of ejection operations of the fourth nozzle is larger than the number of ejection operations of the third nozzle.

DESCRIPTION OF EXEMPLARY EMBODIMENTS

A. First Embodiment

A1. Overall Configuration of Liquid Ejecting Apparatus

Figure 1:
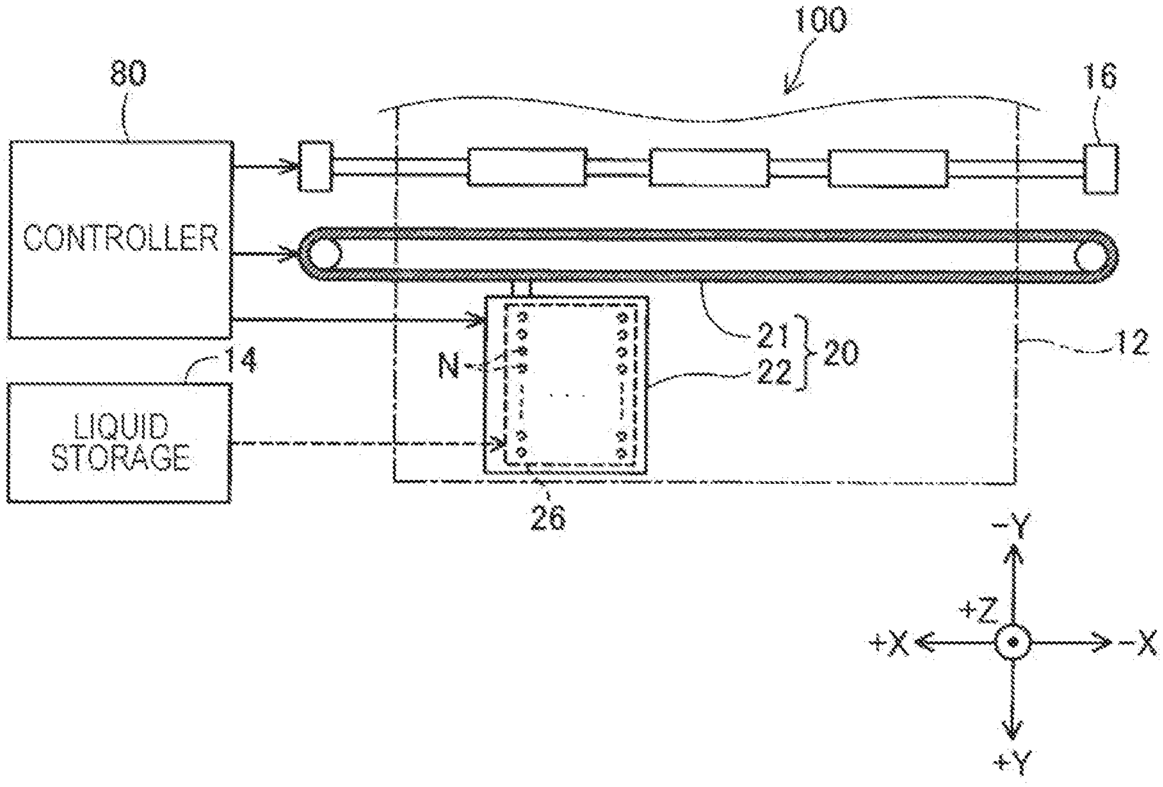
FIG. 1 is a schematic diagram illustrating a schematic configuration of a liquid ejecting apparatus.

FIG. 1 is a schematic diagram illustrating a schematic configuration of a liquid ejecting apparatus 100 according to a first embodiment. The liquid ejecting apparatus 100 is an ink jet printing apparatus configured to perform printing by ejecting droplets of ink, which is a liquid, onto a print medium 12. For the print medium 12, a printing target of any material, such as plastic film or fabric, may be employed in addition to printing sheets. The following description uses the X direction, the Y direction, and the Z direction orthogonal to one another. When two opposite directions are distinguished from each other, the positive direction is expressed as "+", and the negative direction is expressed as "−", and the direction symbol is prefixed accordingly with a plus or minus sign. In the present embodiment, the X direction is the main scanning direction, which is the movement direction of a head unit 26. The Y direction is the sub scanning direction, which is the medium feeding direction orthogonal to the main scanning direction. The −Z direction is the direction of ink ejection. The liquid ejecting apparatus 100 of the present embodiment is a monochrome printer that uses a single color ink to perform printing.

The liquid ejecting apparatus 100 includes the head unit 26, a head movement mechanism 20, a liquid storage 14, a transportation mechanism 16, and a controller 80.

The liquid storage 14 stores the ink to be supplied to the head unit 26. The liquid storage 14 may employ a liquid pack in the form of a bag formed of flexible film, an ink tank to which ink can be added, an ink cartridge configured to be attached and detached, and the like.

The head unit 26 has a plurality of nozzles N to eject ink. The plurality of nozzles N are arranged in the Y direction. The head unit 26 performs an ejection operation for ejecting ink supplied from the liquid storage 14 onto the print medium 12 through the plurality of nozzles N.

The head movement mechanism 20 includes a transportation belt 21 and a carriage 22 housing the head unit 26. The carriage 22 is coupled to the transportation belt 21 and reciprocates in the X direction when the transportation belt 21 is driven. The transportation mechanism 16 transports the print medium 12 in the +Y direction.

The controller 80 controls the ejection operation of the head unit 26. The controller 80 includes one or more processing circuits, examples of which include a central processing unit (CPU) and a field programmable gate array (FPGA), and includes a memory circuit, such as semiconductor memory, and controls the overall operation of the liquid ejecting apparatus 100. The controller 80 is electrically coupled to the transportation mechanism 16, the head movement mechanism 20, and the head unit 26 and controls these units. Liquid from the nozzles N is ejected onto the print medium 12 that is transported by the transportation mechanism 16 so as to print an image on the print medium 12. The head unit 26 includes a plurality of head chips 28 illustrated in FIG. 2.

A2. Configuration of Head Chip

Figure 2:
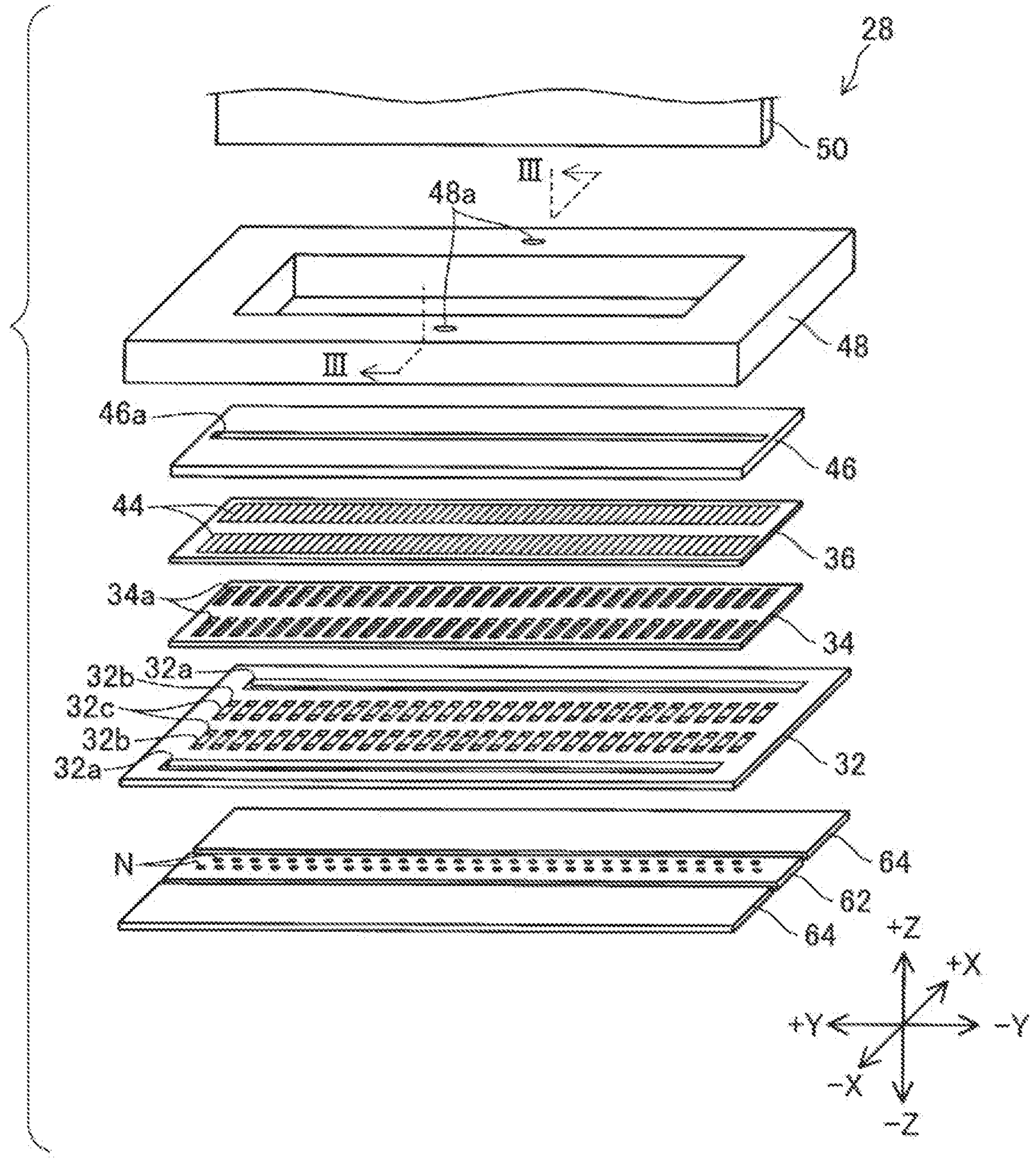
FIG. 2 is an exploded perspective view of a head unit.
Figure 3:
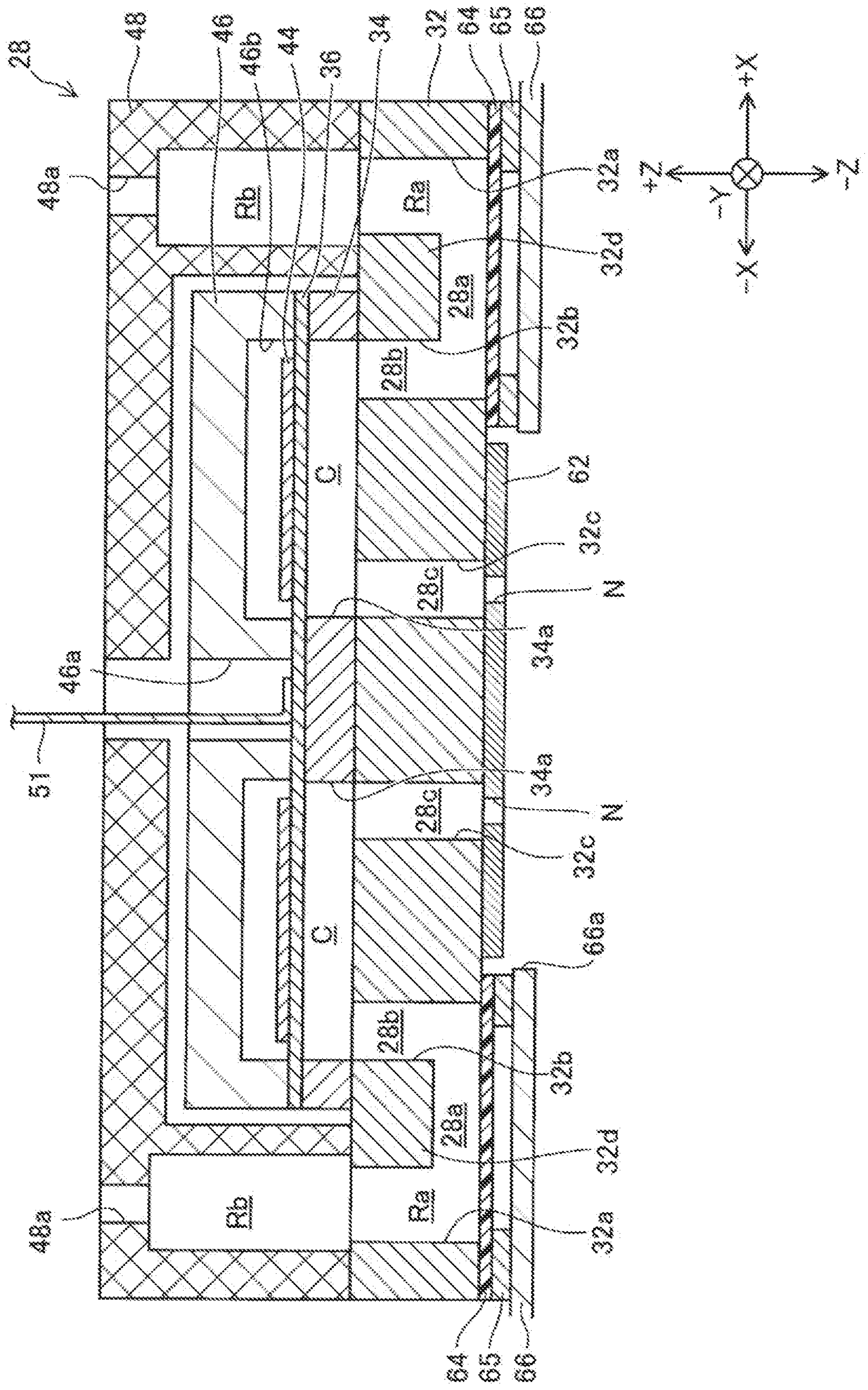
FIG. 3 is a cross-sectional view taken along line III-III in FIG. 2.

FIG. 2 is an exploded perspective view of a head chip 28 according to the embodiment. FIG. 3 is a cross-sectional view taken along line III-III in FIG. 2. Note that line III-III is a line that passes through each of the centers of two nozzles N, one of which is shifted with respect to the other in the Y direction.

As illustrated in FIG. 2, the head chip 28 includes a nozzle plate 62, two vibration absorbers 64, a flow-path substrate 32, a pressure-chamber substrate 34, a vibration plate 36, a sealing member 46, a housing 48, and a circuit substrate 50. The nozzle plate 62, the vibration absorber 64, the flow-path substrate 32, the pressure-chamber substrate 34, the vibration plate 36, and the sealing member 46 are plate-shaped members elongated in the Y direction. Each of the nozzle plate 62, the flow-path substrate 32, the pressure-chamber substrate 34, the vibration plate 36, and the sealing member 46 has a structure substantially line-symmetrical with respect to its center line in the X direction. The shapes of the pressure-chamber substrate 34, the vibration plate 36, and the sealing member 46 in plan view are smaller than the shapes of the flow-path substrate 32 and the housing 48 in plan view. During assembly, the nozzle plate 62 and the two vibration absorbers 64, the flow-path substrate 32, the pressure-chamber substrate 34, the vibration plate 36, the sealing member 46, and the housing 48 are stacked in this order and, for example, attached to one another with an adhesive.

The nozzle plate 62 is a plate-shaped member having a plurality of nozzles N. The nozzle N is a through hole substantially circular in plan view. The plurality of nozzles N are arranged in the Y direction. The plurality of nozzles N are arrayed in two columns, which are located side-by-side in the X direction. The two vibration absorbers 64 are made of flexible film and located on either side of the nozzle plate 62 in the X direction.

The flow-path substrate 32 has two first openings 32*a*, a plurality of second openings 32*b*, and a plurality of third openings 32*c*. In plan view, the first opening 32*a* has a rectangular shape elongated in the Y direction. The first openings 32*a* are formed along the sides of the flow-path substrate 32 parallel to the Y direction. The plurality of second openings 32*b* are arranged in the Y direction. Similarly, the plurality of third openings 32*c* are arranged in the Y direction. The number of columns of the second openings 32*b* and the number of columns of the third openings 32*c* are both two. In the X direction, a first opening 32*a*, one column of second openings 32*b*, one column of third openings 32*c*, one column of third openings 32*c*, one column of second openings 32*b*, and a first opening 32*a* are located side-by-side in this order. A second opening 32*b* and a third opening 32*c* adjacent to each other in the X direction have substantially the same position in the Y direction.

The pressure-chamber substrate 34 has a plurality of openings 34*a*. In plan view, the opening 34*a* has a rectangular shape elongated in the X direction. The plurality of openings 34*a* are arranged in the Y direction. The plurality of openings 34*a* are arrayed in two columns, which are located side-by-side in the X direction. Note that each opening 34*a* is located at a position that overlaps adjacent second and third openings 32*b* and 32*c* formed in the flow-path substrate 32 as viewed in the Z direction.

Piezoelectric elements 44 are formed on the vibration plate 36 at positions that each overlap the corresponding opening 34*a* formed in the pressure-chamber substrate 34 as viewed in the Z direction. The sealing member 46 reinforces the pressure-chamber substrate 34 and the vibration plate 36 and protects the piezoelectric elements 44. The sealing member 46 has a sealing-member opening 46*a* and sealing-member recesses 46*b* illustrated in FIG. 3. In plan view, the sealing-member opening 46*a* has a rectangular shape elongated in the Y direction. As illustrated in FIG. 3, the sealing-member recesses 46*b* are recessed from the surface of the sealing member 46 facing the piezoelectric elements 44.

The circuit substrate 50 has a drive circuit (not illustrated) for driving the piezoelectric elements 44. The drive circuit includes an integrated circuit (IC) chip configured to output drive signals and reference voltages for driving the piezoelectric elements 44. The drive circuit and the piezoelectric elements 44 are electrically coupled via electric wiring 51 illustrated in FIG. 3.

The housing 48 is a case for storing ink and has a frame shape. The housing 48 contains the pressure-chamber substrate 34, the vibration plate 36, and the sealing member 46 in a stacked structure. The housing 48 has through holes 48*a* at either end portion in the X direction.

As illustrated in FIG. 3, the head chip 28 further includes a metal fixation plate 66 to which the above structure is fixed and a metal support 65 for fixing the vibration absorbers 64 to the flow-path substrate 32. The fixation plate 66 has a fixation-plate opening 66*a* for exposing the nozzle plate 62.

The housing 48 has, at both end portions in the X direction, spaces Rb extending in the Y direction. The spaces Rb communicate with the through holes 48*a*. Coupling of the flow-path substrate 32 and the vibration absorbers 64 forms spaces Ra, supply liquid chambers 28*a*, and supply flow paths 28*b*. The space Ra is an internal space of the first opening 32*a*. The supply liquid chamber 28*a* is a space surrounded by a partition wall 32*d*, which is located between the first opening 32*a* and the second opening 32*b*, and the vibration absorber 64. The supply flow path 28*b* is an internal space of the second opening 32*b*. The space Ra communicates with the space Rb and the supply liquid chamber 28*a*, and the supply liquid chamber 28*a* communicates with the supply flow path 28*b*. Coupling of the pressure-chamber substrate 34 and the vibration plate 36 forms pressure chambers C. The pressure chamber C is a space surrounded by the opening 34*a* and the vibration plate 36. The pressure chamber C communicates with the supply flow path 28*b*. Coupling of the flow-path substrate 32 and the nozzle plate 62 forms communication flow paths 28*c*. The communication flow path 28*c* is an internal space of the third opening 32*c*. The communication flow path 28*c* communicates with the pressure chamber C and the nozzle N.

The space Ra and the space Rb function as a liquid storage chamber that stores the ink to be supplied to the pressure chamber C. The space Rb communicates with a plurality of spaces Ra aligned in the Y direction, and the ink supplied via the through hole 48*a* passes through the space Rb and is stored in the plurality of spaces Ra. The ink stored in the space Ra passes through the supply liquid chamber 28*a* and the supply flow path 28*b* and is supplied to the pressure chamber C.

In plan view in the Z direction, each piezoelectric element 44 is located at the position that overlaps the corresponding one of the pairs of the pressure chambers C. A drive signal and a reference voltage are input to the piezoelectric element 44 from the circuit substrate 50 via the electric wiring 51. When the drive signal and the reference voltage are input to the piezoelectric element 44, a voltage is applied to the piezoelectric element 44, and the piezoelectric element 44 deforms. In response to the deformation of the piezoelectric element 44, the vibration plate 36 vibrates, thereby changing the pressure in the pressure chamber C and ejecting ink through the nozzle N. Whether or not to input a drive signal to each piezoelectric element 44 is controlled by the controller 80. As described above, when the drive signal is input to a piezoelectric element 44, ink is ejected through the nozzle N associated with the piezoelectric element 44 to which the drive signal is input, thereby forming a dot on the print medium 12. In contrast, when a drive signal is not applied to a piezoelectric element 44, ink is not ejected through the nozzle N associated with the piezoelectric element 44. The operation of ejecting ink from a nozzle N in response to application of the drive signal is referred to as "ejection operation".

A3. Nozzle Arrangement

Figure 4:
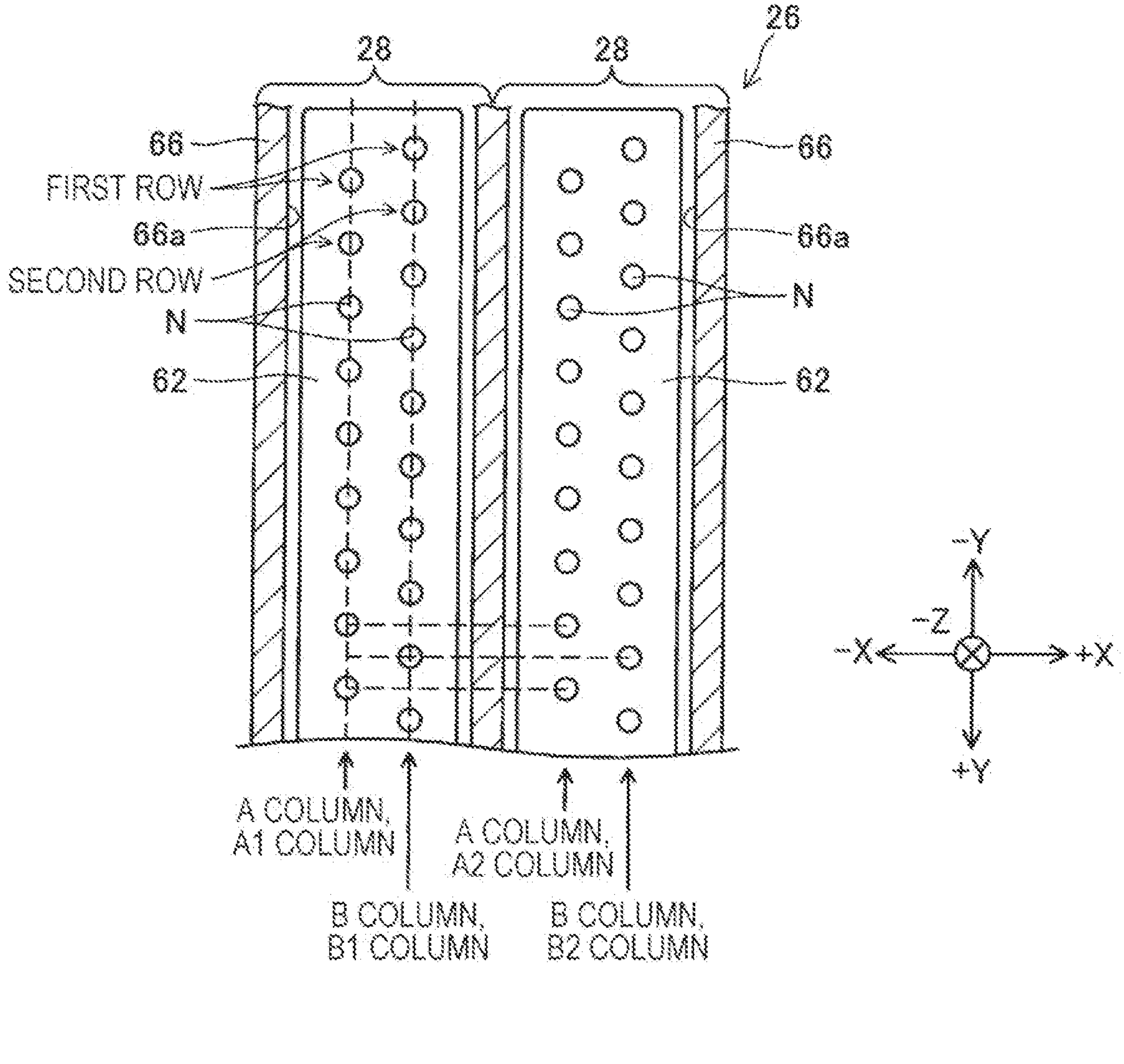
FIG. 4 is a plan view of nozzles for explaining the arrangement configuration.

FIG. 4 is a plan view of the fixation plate 66 and the nozzle plate 62 of the head chip 28 in the +Z direction. In FIG. 4, the fixation plate 66 is hatched.

As illustrated in FIG. 4, the plurality of nozzles N are arrayed in the Y direction, which is a first direction, at regular intervals. One head chip 28 includes two nozzle columns in each of which a plurality of nozzles N is aligned in the Y direction. Here, one of the two columns is referred to as "A column", and the other as "B column". The positions in the X direction of the nozzles N included in the A column differ from the positions in the X direction of the nozzles N included in the B column. Specifically, a nozzle N in the B column is located on the line passing through the center position between two adjacent nozzles N in the A column and being parallel to the X direction. The two head chips 28 are located such that the position in the Y direction of each nozzle N in each A column is the same between the two head chips 28. In other words, the position in the Y direction of each of the nozzles N in the A column is the same between the two head chips 28, and the position in the Y direction of each of the nozzles N in the B column is the same between the two head chips 28.

In the following description, to distinguish any of the nozzles N from others in the same column, ordinal numbers starting at the nozzle N at the uppermost position in the drawing are used to specify the respective rows of each of the nozzles N. In addition, when the two A columns included in the two head chips 28 are distinguished from each other, the left A column in the drawing is referred to as "A1 column", and the right A column in the drawing is referred to as "A2 column". Similarly, when the two B columns included in the two head chips 28 are distinguished from each other, the left B column in the drawing is referred to as "B1 column", and the right B column in the drawing is referred to as "B2 column". The A2 column is located away from the A1 column in the X direction, which is a second direction, intersecting the first direction.

When the controller 80 causes the nozzles N to perform ejection operations, the controller 80 causes each of the nozzles N to perform an ejection operation at the same timing in a predetermined cycle. Specifically, all of the piezoelectric elements 44 receive input of synchronized drive signals. Whether or not a drive signal is input to a piezoelectric element 44 determines whether or not the nozzle N associated with the piezoelectric element 44 performs an ejection operation.

In the configuration of the head unit 26 described above, since the head unit 26 has two nozzles N at the same position in the Y direction, it is possible to form an image by using two nozzles N having the same position in the Y direction for the same raster line. When forming an image by using two nozzles N for the same raster line, since ink is ejected from the other nozzle N even if the landing position of ink ejected from one nozzle N is shifted from the target position, it is possible to reduce image quality degradation caused by variation in the landing positions. Here, the inventors found that when an image is formed by using a plurality of nozzles N for the same raster line and the number of ejection operations is the same among the plurality of nozzles N, image quality is degraded.

Accordingly, as described in detail below, the inventors found that image quality degradation can be reduced by varying the number of ejection operations of each of the nozzles N in control of the same raster line.

A4. Printing Process

Figure 5:
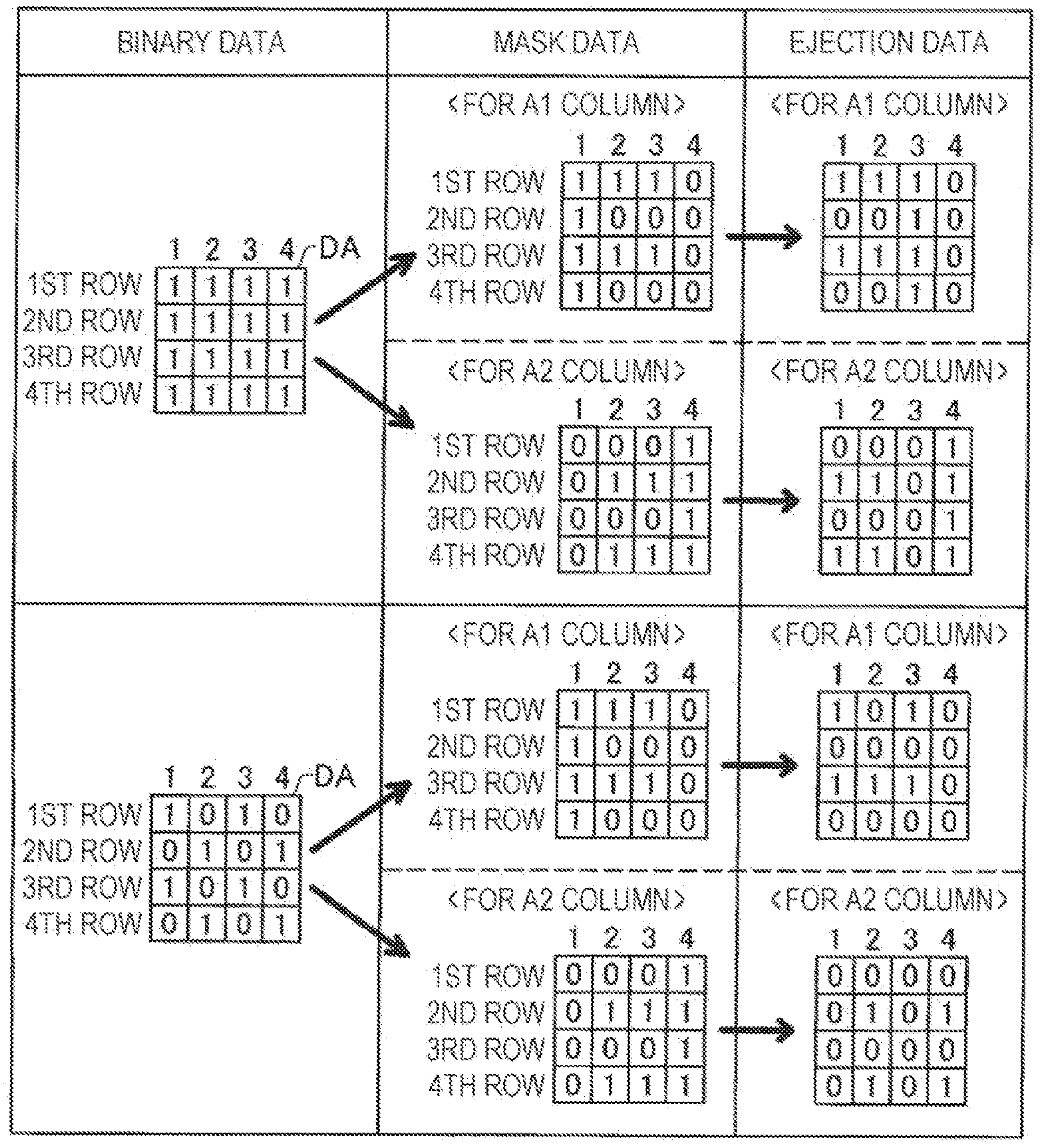
FIG. 5 is a diagram for explaining a method of generating ejection data.
Figure 6:
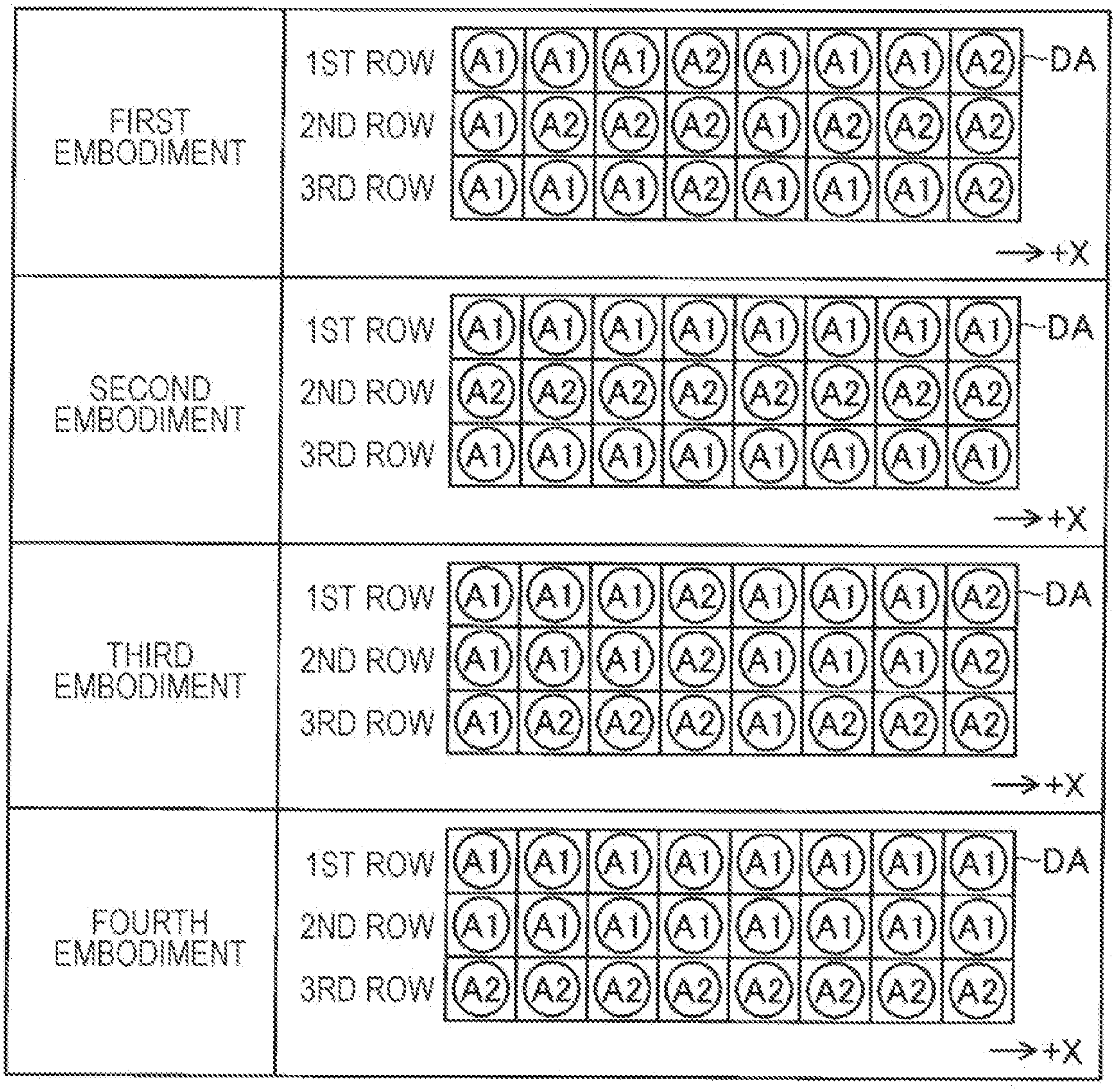
FIG. 6 is a diagram illustrating the relationship between dot formation areas and the nozzle columns in control.
Figure 7:
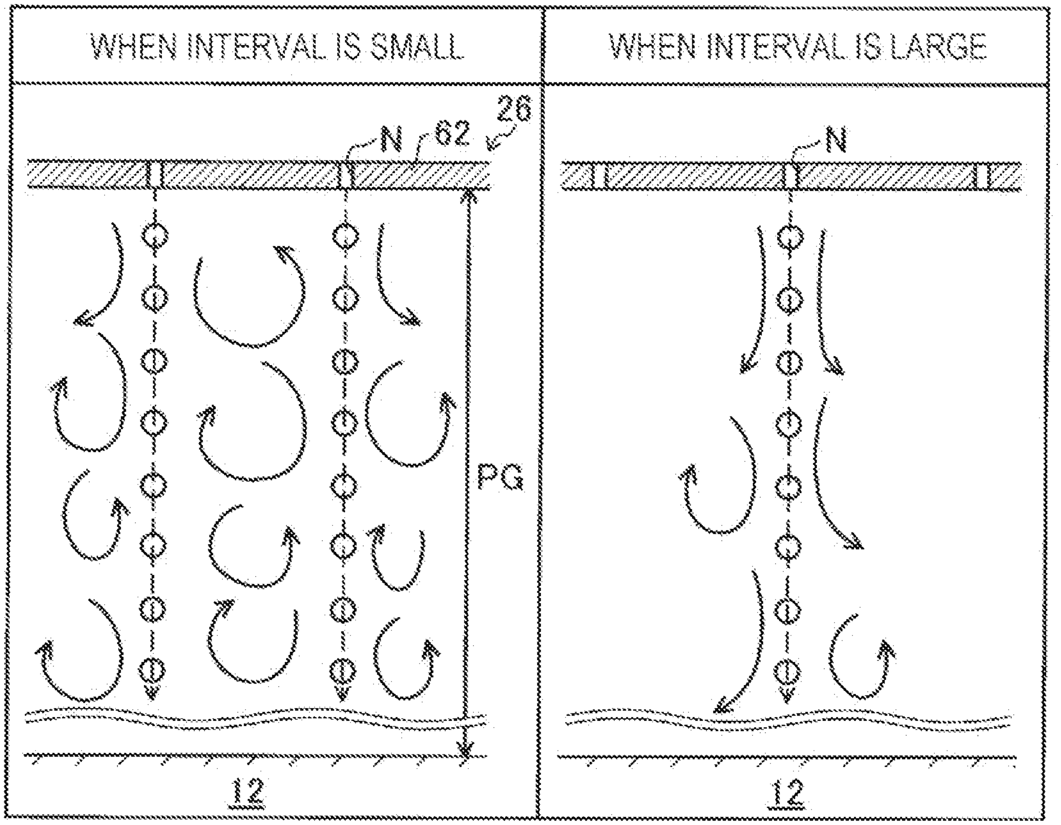
FIG. 7 is a schematic diagram for explaining the occurrence of turbulent air flows.
Figure 8:
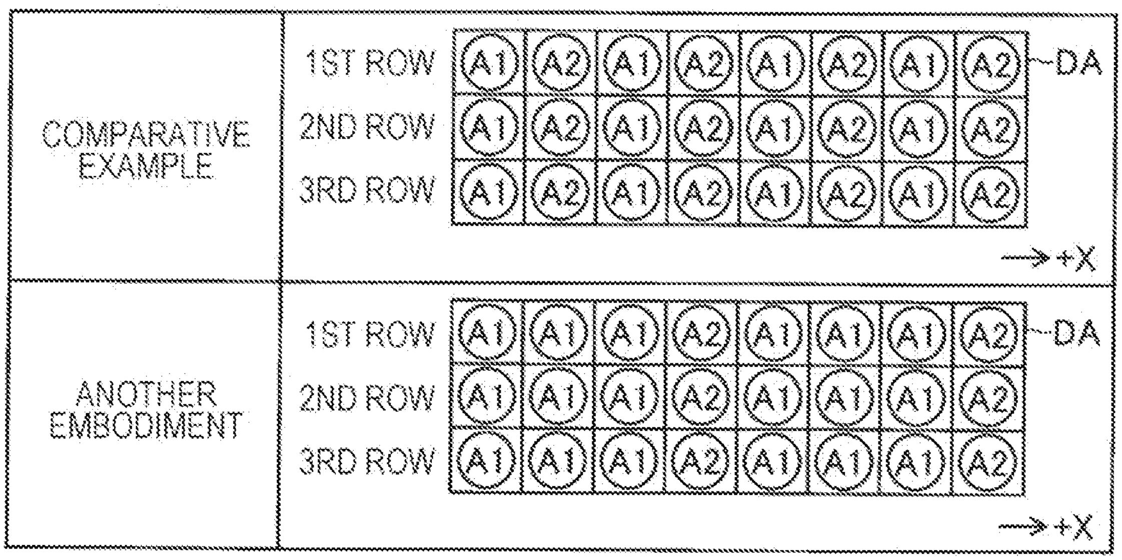
FIG. 8 is a diagram illustrating the relationship between dot formation areas and the nozzle columns in control in a comparative example and another embodiment.

FIG. 5 is a diagram for explaining a method of generating ejection data used in a printing process. FIG. 6 is a diagram illustrating the relationship between dot formation areas DA and the nozzle columns in control. In FIG. 6, only the dot formation areas DA controlled by the nozzles N in the A columns are extracted and illustrated. FIG. 7 is a schematic diagram for explaining the occurrence of turbulent air flows. FIG. 8 is a diagram illustrating the relationship between dot formation areas DA and the nozzle columns in control in a comparative example and another embodiment.

When the controller 80 receives image data for printing, the controller 80 generates binary data indicating whether or not a dot is to be formed in each dot formation area DA, as for example illustrated in FIG. 5. In the binary data in FIG. 5, each dot formation area DA is expressed as a square, and whether or not a dot is to be formed is expressed by the number in the square.

Specifically, a square denoting that a dot is to be formed is denoted by "1", and a square denoting that a dot is not to be formed is denoted by "0". The dot formation areas DA in the same row form the same raster line. The dot formation areas DA in the same column indicate that ejection operations are performed at the same timing in these dot formation areas DA. The numbers horizontally aligned outside the frame of dot formation areas DA indicate ejection operation timings in time series. The same is true of mask data and ejection data described below. Note that the process of generating binary data by using image data may be performed by a printer driver installed in advance in an information processing apparatus communicably coupled to the liquid ejecting apparatus 100. Similarly, generation of ejection data described later may be performed by the information processing apparatus. In this case, the information processing apparatus in which the printer driver is installed can be considered to be part of the liquid ejecting apparatus 100.

The controller 80 generates ejection data for each column by using binary data. Specifically, ejection data is generated by using mask data prepared in advance for each column and prestored in the controller 80. In the present embodiment, for the odd rows of the A1 column, “1” is set in only three out of four ejection operations, and for the even rows, “0” is set in only three out of four ejection operations. Then, for the odd rows of the A2 column, “0” is set in only three out of four ejection operations in a complementary manner to the nozzles N in the same rows of the A1 column, and for the even rows, “1” is set in only three out of four ejection operations. Here, “a complementary manner” denotes the situation in which when the value of a nozzle N in the A1 column is “0”, the value of the nozzle N in the A2 column in the same row and the same column is “1”, and in which when the value of a nozzle N in the A1 column is “1”, the value of the nozzle N in the A2 column in the same row and the same column is “0”.

Ejection data is generated by performing a logical AND operation between the value of the binary data and the value of the mask data for each dot formation area DA. Specifically, if both of the values of the binary data and the mask data are “1”, the value of the ejection data is set to “1”, and in other cases, the value of the ejection data is set to “0”. With this operation, regardless of the value of the binary data, it is possible to set the nozzle N associated with a dot formation area DA for which the value of the mask data is “0” not to perform an ejection operation.

By using generated ejection data, the controller 80 causes the head movement mechanism 20 to perform a print operation. These processes enable a liquid ejection method. As illustrated in the first embodiment in FIG. 6, in the dot formation areas DA in two out of four columns aligned in the main scanning direction, dot formation in two adjacent raster lines controlled by the A columns is shared by the nozzles N of the A1 column and the nozzles N of the A2 column. Thus, the frequency with which two adjacent nozzles N in the same column perform an ejection operation is low. This reduces image quality degradation in the print image and is likely due to the configuration reducing disturbance in air flow at the time when nozzles N eject ink onto the print medium 12.

Detailed description will be given with reference to FIG. 7 as follows. In a print operation, movement of the head unit 26 in the scanning direction relative to the print medium 12 causes air flows between the head unit 26 and the print medium 12. Accordingly, it is conceivable that when the nozzles N eject ink onto the print medium 12, turbulent air flows occur near the flight paths of ink. The occurrence of turbulent air flows likely causes a deviation in the landing positions of ink droplets, especially satellites with low mass, from their target positions, which degrades image quality. In this respect, in the present embodiment, as in the first embodiment in FIG. 6, taking the A1 column as an example, an ejection operation is performed by the nozzles N in every other row in the A1 column in the dot formation areas DA in two out of four columns arranged in the scanning direction. Hence, in the dot formation areas DA in these two columns, the distance between nozzles N that perform an ejection operation is longer than when two adjacent nozzles N in the A1 column each perform an ejection operation. Hence, as illustrated in “WHEN INTERVAL IS LARGE” in FIG. 7, there are spaces through which ink droplets do not travel, which reduces disturbance in air flow. Hence, it is conceivable that this in turn reduces variation in the landing positions of ink and reduces image quality degradation. Note that “WHEN INTERVAL IS SMALL” in FIG. 7 illustrates ejection operations performed by two adjacent nozzles N in the same column, and “WHEN INTERVAL IS LARGE” illustrates an ejection operation performed by one of two adjacent nozzles N in the same column.

The comparative example in FIG. 8 is a case in which the scenario in “WHEN INTERVAL IS SMALL” in FIG. 7 occurs. Specifically, in two adjacent raster lines controlled by the A columns, two adjacent nozzles N in the same column perform ejection operations at the same time. In this case, a strong disturbance in air flow is likely to occur as described above, and variation in the landing positions of ink is likely to occur. Note that this case occurs when the nozzle N in the first row of the A1 column, which is a first nozzle, the nozzle N in the first row of the A2 column, which is a second nozzle, the nozzle N in the second row of the A1 column, which is a third nozzle, and the nozzle N in the second row of the A2 column, which is a fourth nozzle, are used, and control is performed such that the number of ejection operations of the first nozzle and the number of ejection operations of the second nozzle are the same and the number of ejection operations of the fourth nozzle and the number of ejection operations of the third nozzle are the same.

The A1 column is also referred to as “first nozzle column”, and the A2 column is also referred to as “second nozzle column”. The nozzle N in the first row of the A1 column is also referred to as “first nozzle”, and the nozzle N in the first row of the A2 column is also referred to as “second nozzle”. The nozzle N in the second row of the A1 column is also referred to as “third nozzle”, and the nozzle N in the second row of the A2 column is also referred to as “fourth nozzle”.

In ejection operations in the first embodiment described above, the number of ejection operations of the nozzles N in the odd rows of the A1 column is set to be larger than the number of ejection operations of the nozzles N in the odd rows of the A2 column. The number of ejection operations of the nozzles N in the even rows of the A2 column is set to be larger than the number of ejection operations of the nozzles N in the even rows of the A1 column. Hence, the frequency with which two adjacent nozzles N in the same column perform ejection operations is lower in the first embodiment than when the numbers of ejection operations of two nozzles N in the same rows of the A1 column and the A2 column are set to be the same. Thus, disturbance in air flow is weak, which reduces image quality degradation caused by positional deviation in the landing positions of ink.

A5. Another Example of First Embodiment

Another embodiment in FIG. 8 illustrates the relationship between dot formation areas DA and the nozzle columns in control in a case in which the nozzle N in the first row of the A1 column, which is a first nozzle, the nozzle N in the first row of the A2 column, which is a second nozzle, the nozzle N in the fourth row of the A1 column, which is a third nozzle, and the nozzle N in the fourth row of the A2 column, which is a fourth nozzle, are used, and ejection operations are controlled such that the number of ejection operations of the first nozzle is larger than the number of ejection operations of the second nozzle and the number of ejection operations of the fourth nozzle is larger than the number of ejection operations of the third nozzle. In this case, even though three adjacent nozzles N in the same column perform ejection operations at the same time, all of the nozzles N in the same column do not perform ejection operations at the same time. Thus, disturbance in air flow is weaker than in the comparative example in FIG. 8. This, in turn, reduces image quality degradation in the print image. However, in the present embodiment, since the three nozzles N that perform ejection operations are adjacent to one another, and in addition, since these three nozzles N perform ejection operations three times in succession, it is conceivable that a strong disturbance in air flow is more likely to occur than in the ejection method according to the first embodiment. Hence, the ejection method according to the first embodiment is preferable to that of the present embodiment. In other words, it is preferable that the second nozzle be adjacent to the fourth nozzle, the number of ejection operations of which is larger than that of the third nozzle, and that the third nozzle be adjacent to the first nozzle, the number of ejection operations of which is larger than that of the second nozzle.

With reference to the three figures of the first embodiment in FIG. 6 and the comparative example and another embodiment in FIG. 8, other effects provided by the first embodiment will be described in detail.

A case of allotting each row evenly to the A1 column and the A2 column as in the comparative example in FIG. 8 will be discussed. In this case, each of the A1 column and the A2 column performs 50% of the ejection operations in each row. Accordingly, all of the nozzles included in the A1 column will perform ejection operations at a relatively high rate of 50% per column. The same is true of the A2 column. Thus, when each of the A1 column and the A2 column is performing ejection operations at a relatively high rate of 50%, as droplets move downward with the ejection operations of each of the A1 column and the A2 column, surrounding gas is sucked and moves downward, causing a downward air flow. Meanwhile, when the head unit 26 performs scanning relative to the print medium 12, inflowing air due to the scanning flows between the head unit 26 and the print medium 12, and as a result, air flows occur in planar directions. In the case of the comparative example in FIG. 8, air flows caused by the scanning interfere beneath the A1 column and the A2 column with the air flows caused by ejection operations at a relatively high rate, and accordingly, it is possible for, for example, large turbulent air flows to occur. The turbulent air flows cause a shift in the landing positions of ejected ink, especially low-density satellite droplets, which can degrade image quality.

Next, a case of allotting each row in a biased manner as in another embodiment in FIG. 8 such that the number of allotments to the A1 column is larger than the number of allotments to the A2 column will be discussed. In this case, since the use ratio of the A2 column is as low as 25% in each row, the effect of surrounding gas being sucked with ejection operations is small, and downward air flows are not as strong. Hence, the above air flows due to scanning are less likely to interfere with other air flows beneath the A2 column, and thus, image quality degradation is less likely to result from the interference. On the other hand, since the use ratio of the A1 column is as high as 75%, air flows due to ejection operations can occur more significantly than in the comparative example in FIG. 8. In addition, since all of the nozzles of the A1 column perform ejection operations at a use ratio of 75%, inflowing air in the scanning direction cannot be diverted around the air flows derived from the A1 column, thereby causing turbulent air flows, and accordingly, there is an eventual possibility of image quality degradation.

In contrast, in the first embodiment, allotment in the odd rows is biased such that the number of allotments to the A1 column is larger than the number of allotments to the A2 column. In the even rows, allotment is biased such that the number of allotments to the A2 column is larger than the number of allotments to the A1 column. With this configuration, overall, ejection operations from a row in the A1 column in which the number of ejection operations is larger, and ejection operations from a row in the A2 column in which the number of ejection operations is larger, occur alternately. In this case, air flows due to scanning can be diverted around the spaces between the even rows whose use ratio is as low as 25% at a position of the A1 column, and also at a position of the A2 column, air flows due to scanning can be diverted around the spaces between the odd rows whose use ratio is as low as 25%. With this operation, turbulent air flows are less likely to occur, and thus, it is possible to reduce degradation of ejection characteristics.

B. Second Embodiment

In the first embodiment, the nozzles N in the odd rows of the A2 column and the nozzles N in the even rows of the A1 column are used in a print operation. In contrast, control in the present embodiment is performed such that the nozzles N in the odd rows of the A2 column and the nozzles N in the even rows of the A1 column are not used. The configuration of the liquid ejecting apparatus 100 is the same as or similar to that of the first embodiment, and thus, description thereof is omitted. The same is true of a third embodiment and a fourth embodiment described later.

As illustrated in the second embodiment in FIG. 6, the nozzles N in the odd rows of the A1 column are used for the raster lines of the odd rows out of the raster lines controlled by the A columns, and the nozzles N in the even rows of the A2 column are used for the raster lines of the even rows. Hence, since one of every two adjacent nozzles N in the same column does not perform an ejection operation, it is possible to further reduce disturbance in air flow.

The second embodiment described above provides effects the same as or similar to those of the first embodiment. Specifically, the number of ejection operations of the nozzles N in the odd rows of the A1 column is larger than the number of ejection operations of the nozzles N in the odd rows of the A2 column, and the number of ejection operations of the nozzles N in the even rows of the A2 column is larger than the number of ejection operations of the nozzles N in the even rows of the A1 column. Then, control is performed such that the nozzles N in the odd rows of the A2 column and the nozzles N in the even rows of the A1 column are not used. Thus, one of every two adjacent nozzles N in the same column does not perform an ejection operation, and it is possible to further reduce disturbance in air flow.

In the second embodiment, the A2 column is not used in the odd rows, and the A1 column is not used in the even rows. Thus, air flows due to scanning can be diverted preferably through the even rows that are not performing ejection operations at the positions of the A1 column, and at the positions of the A2 column, air flows due to scanning can be diverted preferably through the odd rows. Thus, the second embodiment, compared to the first embodiment, can reduce the occurrence of turbulent air flows and degradation of ejection characteristics.

C. Third Embodiment

In the first embodiment, whether or not to perform ejection operations is controlled in minimum units of the nozzles N at two rows of an A column. In the third and fourth embodiments, whether or not to perform ejection operations is controlled in minimum units of the nozzles N at three rows of an A column.

In the present embodiment, as illustrated in the third embodiment in FIG. 6, for two out of three adjacent raster lines controlled by the A columns, the dot formation areas DA in two out of four columns aligned in the main scanning direction are allotted to the nozzles N of both of the A1 column and the A2 column to form dots. This configuration decreases the frequency with which all of the three adjacent nozzles N in the same column perform ejection operations, which reduces disturbance in air flow.

In the comparative example in FIG. 8, for three adjacent raster lines controlled by the A columns, three adjacent nozzles N in the same column perform ejection operations at the same time. In this case, as described above, strong disturbance is likely to occur in air flows, and variation in the landing positions of ink is likely to occur. Note that this case occurs when the nozzle N in the first row of the A1 column, which is a first nozzle, the nozzle N in the first row of the A2 column, which is a second nozzle, the nozzle N in the second row of the A1 column, which is a fifth nozzle, the nozzle N in the second row of the A2 column, which is a sixth nozzle, the nozzle N in the third row of the A1 column, which is a third nozzle, and the nozzle N in the third row of the A2 column, which is a fourth nozzle, are used, and control is performed such that the number of ejection operations of the first nozzle and the number of ejection operations of the second nozzle are the same, the number of ejection operations of the third nozzle and the number of ejection operations of the fourth nozzle are the same, and the number of ejection operations of the fifth nozzle and the number of ejection operations of the sixth nozzle are the same.

The nozzle N in the first row of the A1 column is also referred to as "first nozzle", and the nozzle N in the first row of the A2 column is also referred to as "second nozzle". The nozzle N in the second row of the A1 column is also referred to as "fifth nozzle", and the nozzle N in the second row of the A2 column is also referred to as "sixth nozzle". The nozzle N in the third row of the A1 column is also referred to as "third nozzle", and the nozzle N in the third row of the A2 column is also referred to as "fourth nozzle".

In the third embodiment described above, the number of ejection operations of the nozzles N in the first and second rows of the A1 column is larger than the number of ejection operations of the nozzles N in the first and second rows of the A2 column, and the number of ejection operations of the nozzles N in the third row of the A2 column is larger than the number of ejection operations of the nozzle N in the third row of the A1 column. This configuration decreases the frequency with which all of three adjacent nozzles N in the same column perform ejection operations, which reduces disturbance in air flow.

D. Fourth Embodiment

In the third embodiment, the nozzles N in the first and second rows of the A2 column and the nozzles N in the third row of the A1 column are used in a print operation. In contrast, in the present embodiment, the nozzles N in the first and second rows of the A2 column and the nozzles N in the third row of the A1 column are not used in a print operation.

In the present embodiment, as illustrated in the fourth embodiment in FIG. 6, for three adjacent raster lines controlled by the A columns, dots are formed by the nozzles N of the A1 column in two adjacent raster lines, and dots are formed by the nozzles N of the A2 column in the one raster line. With this configuration, since all of the three adjacent nozzles N in the same column do not perform ejection operations, it is possible to further reduce disturbance in air flow.

The embodiment described above provides effects the same as or similar to those of the third embodiment. Specifically, the number of ejection operations of the nozzle N in the first row of the A1 column is larger than the number of ejection operations of the nozzle N in the first row of the A2 column, and the number of ejection operations of the nozzle N in the third row of the A2 column is larger than the number of ejection operations of the nozzle N in the third row of the A2 column. Then, the number of ejection operations of the nozzle N in the second row of the A1 column is larger than the number of ejection operations of the nozzle N in the second row of the A2 column. In addition, control is performed not to use the nozzles N in the first and second rows of the A2 column and the nozzle N in the third row of the A1 column. With this configuration, since all of the three adjacent nozzles N in the same column do not perform ejection operations, it is possible to further reduce disturbance in air flow.

E. Fifth Embodiment

Figures 9, 10:
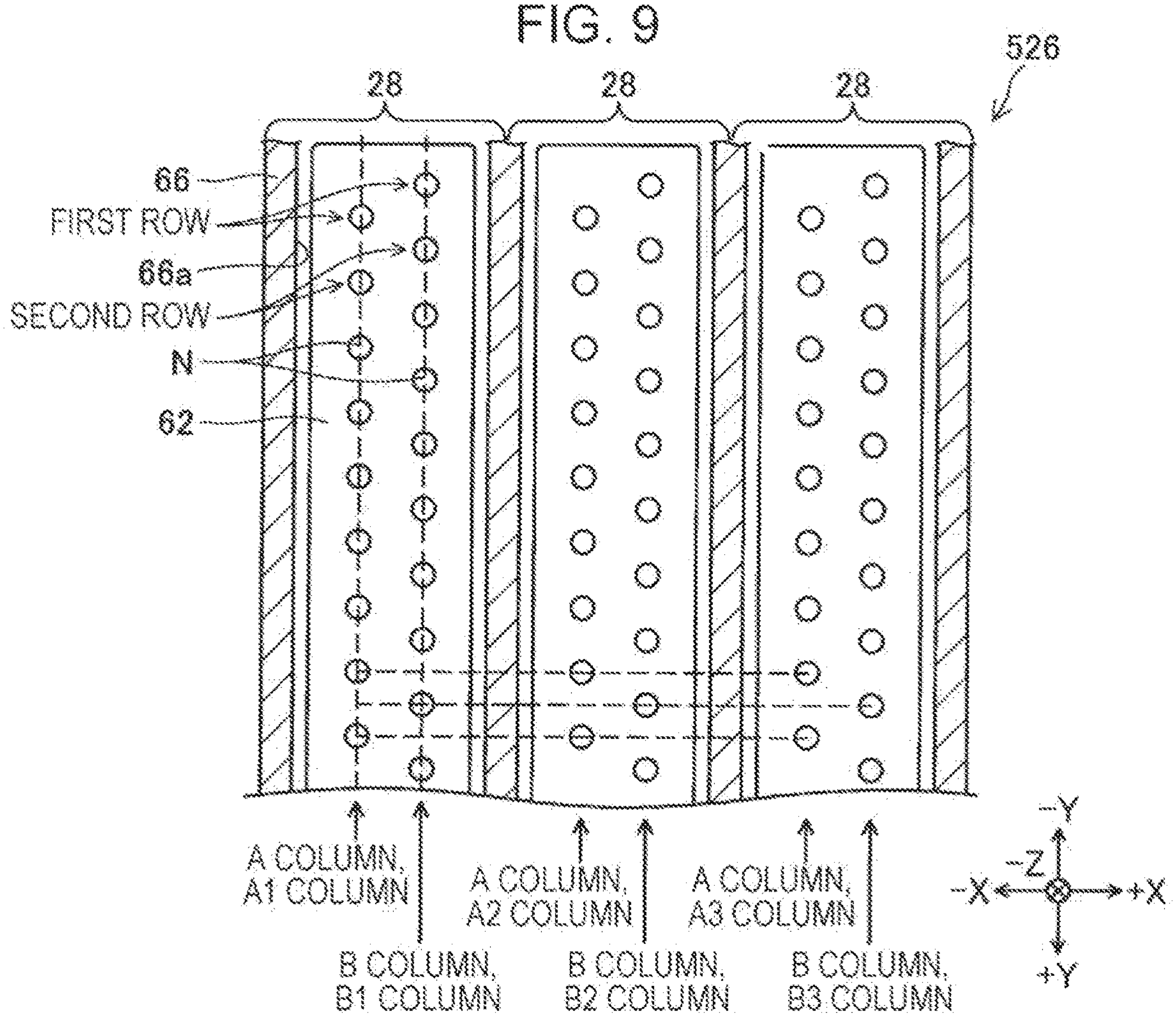
FIG. 9 is a plan view of nozzles according to fifth and sixth embodiments for explaining the arrangement configuration.
FIG. 10 is a diagram illustrating the relationship between dot formation areas and the nozzle columns in control in the fifth and sixth embodiments.

FIG. 9 is a plan view of nozzles according to fifth and sixth embodiments for explaining the arrangement configuration. FIG. 10 is a diagram illustrating the relationship between dot formation areas and the nozzle columns in control according to the fifth and sixth embodiments. In FIG. 10, only the dot formation areas DA controlled by the nozzles N in the A columns are extracted and illustrated. The head unit 26 in the foregoing embodiments has two head chips 28. Unlike the foregoing embodiments, a head unit 526 according to the fifth and sixth embodiments has three head chips 28 as illustrated in FIG. 9. The other constituents are the same as or similar to those of the foregoing embodiments. Thus, the same constituents are denoted by the same reference numerals, and description thereof is omitted. As in the foregoing description, when the three A columns are distinguished from one another, they are referred to "A1 column", "A2 column", and "A3 column" from the left in the drawing.

In the present embodiment, as illustrated in the fifth embodiment in FIG. 10, for three adjacent raster lines controlled by the A columns, dots are formed mainly by the nozzles N of the A1 column on the first raster line, dots are formed mainly by the nozzles N of the A3 column on the second raster line, and dots are formed mainly by the nozzles N of the A2 column on the third raster line. Specifically, for the first raster line, dots are formed by the nozzles N of the A1 column twice in every four ejection operations, dots are formed by the nozzles N of the A2 column once in every four ejection operations, and dots are formed by the nozzles N of the A3 column once in every four ejection operations. For the second raster line, dots are formed by the nozzles N of the A3 column twice in every four ejection operations, dots are formed by the nozzles N of the A1 column once in every four ejection operations, and dots are formed by the nozzles N of the A2 column once in every four ejection operations. For the third raster line, dots are formed by the nozzles N of the A2 column twice in every four ejection operations, dots are formed by the nozzles N of the A1 column once in every four ejection operations, and dots are formed by the nozzles N of the A3 column once in every four ejection operations. This configuration decreases the frequency with which all of three adjacent nozzles N in the same column perform ejection operations, which reduces disturbance in air flow.

The A1 column is also referred to as "first nozzle column", the A2 column as "third nozzle column", and the A3 column as "second nozzle column". The nozzle N in the first row of the A1 column is also referred to as "first nozzle", the nozzle N in the second row of the A1 column as "third nozzle", and the nozzle N in the third row of the A1 column as "seventh nozzle". The nozzle N in the first row of the A2 column is also referred to as "ninth nozzle", the nozzle N in the second row of the A2 column as "tenth nozzle", and the nozzle N in the third row of the A2 column as "eleventh nozzle". The nozzle N in the first row of the A3 column is also referred to as "second nozzle", the nozzle N in the second row of the A3 column as "fourth nozzle", and the nozzle N in the third row of the A3 column as "eighth nozzle". The same is true of the sixth embodiment described later.

In the fifth embodiment described above, the number of ejection operations of the nozzle N in the first row of the A1 column is larger than the number of ejection operations of the nozzle N in the first row of the A2 column and larger than the number of ejection operations of the nozzle N in the first row of the A3 column. The number of ejection operations of the nozzle N in the second row of the A2 column is larger than the number of ejection operations of the nozzle N in the second row of the A1 column and larger than the number of ejection operations of the nozzle N in the second row of the A3 column. The number of ejection operations of the nozzle N in the third row of the A3 column is larger than the number of ejection operations of the nozzle N in the third row of the A1 column and larger than the number of ejection operations of the nozzle N in the third row of the A2 column. This configuration decreases the frequency with which all of three adjacent nozzles N in the same column perform ejection operations, which reduces disturbance in air flow.

F. Sixth Embodiment

In the above fifth embodiment, the nozzles N of the A2 column are used in a print operation. In contrast, in the present embodiment, control is performed not to use the nozzles N of the A2 column in a print operation.

In the present embodiment, as illustrated in the sixth embodiment in FIG. 10, for three adjacent raster lines controlled by the A columns, dots are formed mainly by the nozzles N of the A1 column on the first and third raster lines, dots are formed mainly by the nozzles N of the A3 column on the second raster line, and the nozzles N of the A2 column do not perform ejection operations. The nozzles N of the A2 column are not used. This configuration decreases the frequency with which all of three adjacent nozzles N in the same column perform ejection operations. In addition, the distance between the nozzles N that perform ejection operations is longer than when the nozzles N of the A2 column perform ejection operations. This further reduces disturbance in air flow.

In the sixth embodiment described above, the number of ejection operations of the nozzle N in the first row of the A1 column is larger than the number of ejection operations of the nozzle N in the first row of the A2 column and larger than the number of ejection operations of the nozzle N in the first row of the A3 column. The number of ejection operations of the nozzle N in the second row of the A3 column is larger than the number of ejection operations of the nozzle N in the second row of the A1 column and larger than the number of ejection operations of the nozzle N in the second row of the A2 column. The number of ejection operations of the nozzle N in the third row of the A1 column is larger than the number of ejection operations of the nozzle N in the third row of the A2 column and larger than the number of ejection operations of the nozzle N in the third row of the A3 column. This configuration decreases the frequency with which all of three adjacent nozzles N in the same column perform ejection operations, which reduces disturbance in air flow.

G. Seventh Embodiment

In the foregoing first embodiment, regardless of the distance PG between the head unit 26 and the print medium 12 illustrated in FIG. 7, the controller 80 performs a setting such that the number of ejection operations of the nozzles N in the odd rows of the A1 column is larger than the number of ejection operations of the nozzles N in the odd rows of the A2 column and the number of ejection operations of the nozzles N in the even rows of the A2 column is larger than the number of ejection operations of the nozzles N in the even rows of the A1 column. In the present embodiment, when the distance PG between the head unit 26 and the print medium 12 is a predetermined first distance, the number of ejection operations of the nozzles N in the odd rows of the A1 column is set to be substantially equal to the number of ejection operations of the nozzles N in the odd rows of the A2 column. In addition, the number of ejection operations of the nozzles N in the even rows of the A1 column is set to be substantially equal to the number of ejection operations of the nozzles N in the even rows of the A2 column. This configuration makes variation in the landing positions of ink ejected from the nozzles N less visible. However, when the distance PG between the head unit 26 and the print medium 12 is a second distance that is longer than the first distance, the controller 80, as in the first embodiment, performs a setting such that the number of ejection operations of the nozzles N in the odd rows of the A1 column is larger than the number of ejection operations of the nozzles N in the odd rows of the A2 column. In addition, the controller 80 performs a setting such that the number of ejection operations of the nozzles N in the even rows of the A2 column is larger than the number of ejection operations of the nozzles N in the even rows of the A1 column. This configuration reduces variation in the landing positions caused by the occurrence of turbulent air flows.

When turbulent air flows occur, the longer the distance PG between the head unit 26 and the print medium 12, the larger the deviation in the landing positions of ink from the target positions. Hence, when the deviation in the landing positions of ink from the target positions is large, the number of ejection operations of the nozzles N of the A1 column and the number of ejection operations of the nozzles N of the A2 column are set to be different as in the first embodiment. With this configuration, when variation in the landing positions due to turbulent air flows is likely to occur, it is possible to change the number of ejection operations of each nozzle N by using the distance PG. Note that the first distance which serves as a reference to change the number of ejection operations can be determined by conducting an experiment to find the relationship between the distance PG and evaluation results of image quality.

H. Eighth Embodiment

In the foregoing first embodiment, regardless of the surface tension of ink to be ejected from the head unit 26, the controller 80 performs a setting such that the number of ejection operations of the nozzles N in the odd rows of the A1 column is larger than the number of ejection operations of the nozzles N in the odd rows of the A2 column and the number of ejection operations of the nozzles N in the even rows of the A2 column is larger than the number of ejection operations of the nozzles N in the even rows of the A1 column. In the present embodiment, (i) when the surface tension of ink to be ejected from the head unit 26 is a predetermined first value, the number of ejection operations of the nozzles N in the odd rows of the A1 column and the number of ejection operations of the nozzles N in the odd rows of the A2 column are set to be substantially equal. Then, (ii) when the surface tension of ink to be ejected from the head unit 26 is a second value smaller than the first value, the controller 80, as in the first embodiment, performs a setting such that the number of ejection operations of the nozzles N in the odd rows of the A1 column is larger than the number of ejection operations of the nozzles N in the odd rows of the A2 column. In addition, the controller 80 performs a setting such that the number of ejection operations of the nozzles N in the even rows of the A2 column is larger than the number of ejection operations of the nozzles N in the even rows of the A1 column. Specifically, the controller 80 stores in advance an association table between the type of liquid and the surface tension. Then, the controller 80 changes control by obtaining the type of liquid stored in the liquid storage 14.

The surface tension of ink differs depending on the type of ink, specifically, substances contained in ink. In general, the lower the surface tension, the more likely satellites are to occur. Then, when turbulent air flows occur, the flight paths of satellites are likely to change due to the turbulent air flows. Thus, it is conceivable that the smaller the surface tension of ink, the larger the deviation in the landing positions of ink from the target positions. Hence, when the deviation in the landing positions of ink from the target positions is large, the number of ejection operations of the nozzles N of the A1 column and the number of ejection operations of the nozzles N of the A2 column are set to be different as in the first embodiment. With this configuration, when variation in the landing positions due to turbulent air flows is likely to occur, it is possible to change the number of ejection operations of each nozzle N by using the surface tension of ink. Note that the first value which serves as a reference to change the number of ejection operations can be determined by conducting an experiment to find the relationship between the surface tension of ink and evaluation results of image quality.

I. Ninth Embodiment

In the foregoing first embodiment, regardless of the amount of ink to be ejected per nozzle N in the head unit 26, the number of ejection operations of the nozzles N in the odd rows of the A1 column is set to be larger than the number of ejection operations of the nozzles N in the odd rows of the A2 column, and the number of ejection operations of the nozzles N in the even rows of the A2 column is set to be larger than the number of ejection operations of the nozzles N in the even rows of the A1 column. In the present embodiment, the controller 80, (i) when the amount of ink to be ejected per nozzle N in the head unit 26 is a predetermined first amount, performs a setting such that the number of ejection operations of the nozzles N in the odd rows of the A1 column and the number of ejection operations of the nozzles N in the odd rows of the A2 column are substantially equal. Then, (ii) when the amount of ink to be ejected per nozzle N in the head unit 26 is a second amount which is smaller than the first amount, the controller 80, as in the first embodiment, performs a setting such that the number of ejection operations of the nozzles N in the odd rows of the A1 column is larger than the number of ejection operations of the nozzles N in the odd rows of the A2 column. In addition, the controller 80 performs a setting such that the number of ejection operations of the nozzles N in the even rows of the A2 column is larger than the number of ejection operations of the nozzles N in the even rows of the A1 column.

In general, when the amount of ink to be ejected from a nozzle N is small, satellites are more likely to occur than when the amount of ejected ink is large. As described above, it is conceivable that when satellites are likely to occur, deviation in the landing positions of ink from the target positions is large. Hence, when the deviation in the landing positions of ink from the target positions is large, the number of ejection operations of the nozzles N of the A1 column and the number of ejection operations of the nozzles N of the A2 column are set to be different as in the first embodiment. With this configuration, when variation in the landing positions due to turbulent air flows is likely to occur, it is possible to change the number of ejection operations of each nozzle N by using the amount of ink to be ejected. Note that the first amount which serves as a reference to change the number of ejection operations can be determined by conducting an experiment to find the relationship between the amount of ejected liquid and evaluation results of image quality.

J. Other Embodiments (J1) In the foregoing first embodiment, mask data is used to control whether each nozzle N is to perform an ejection operation. However, control to determine whether each nozzle N is to perform an ejection operation is not limited to methods using mask data.

(J2) In the foregoing second embodiment, dots in every row are formed alternately by the nozzles N of the A1 column and the nozzles N of the A2 column. In the above fourth embodiment, although a description was not given of operation on the fourth raster line and below controlled by the A columns, dots in every two rows may be formed alternately by the nozzles N of the A1 column and the nozzles N of the A2 column. The number of adjacent nozzles N that perform ejection operations in the same column and at the same timing may be three or more. When a nozzle column of the head unit 26 has M nozzles N, and the number of adjacent nozzles N that perform ejection operations in the same column at the same timing is defined as K, it is favorable that K satisfy $1 \leq K < M/2$, it is preferable that K satisfy $K < M/10$, and it is more preferable that K satisfy $K < M/50$. In particular, it is acceptable that K=1 or 2.

(J3) The present disclosure can be applied not only to ink jet printers but also to any liquid ejecting apparatuses that eject liquid other than ink. For example, the present disclosure is applicable to the following various types of liquid ejecting apparatuses and their cartridges.

(1) Image printing apparatuses such as fax machines (2) Liquid ejecting apparatuses that eject coloring materials used for manufacturing color filters for image display apparatuses such as liquid crystal displays (3) Liquid ejecting apparatuses that eject electrode materials used for forming electrodes of organic electro luminescence (EL) displays, field emission displays (FEDs), and the like (4) Liquid ejecting apparatuses that eject a liquid containing bio organic matter used for manufacturing biochips (5) Specimen ejecting apparatuses as precision pipettes (6) Liquid ejecting apparatuses for lubricating oil (7) Liquid ejecting apparatuses for resin liquid (8) Liquid ejecting apparatuses that eject a lubricating oil in a pin-point manner to precision machines such as watches and cameras (9) Liquid ejecting apparatuses that eject a transparent resin liquid such as an ultraviolet curable resin onto a substrate to form micro hemispherical lenses (optical lenses) or the like used for optical communication elements or the like

(10) Liquid ejecting apparatuses that eject an acidic or alkaline etchant to etch a substrate or the like

(11) Liquid ejecting apparatus including a liquid ejecting head that ejects droplets of a small amount of liquid of any other kinds Note that "droplets" denote a state of liquid ejected from a liquid ejecting apparatus and include ones with shapes leaving tails having granular shapes, tear-like shapes, and thread-like shapes. Here, "liquid" denotes any material that can be ejected by a liquid ejecting apparatus. For example, "liquid" may be a material in a state in which the substances are in a liquid phase and includes materials in the liquid state having a high or low viscosity; sol; gel water; and other materials in a liquid state such as inorganic solvents, organic solvents, solutions, liquid resins, and liquid metals. The term "liquid" includes not only liquid as one state of substances but also solvents in which particles of functional materials composed of solid substances such as pigments and metal particles are dissolved, dispersed, or mixed, for example. Typical examples of liquid include ink and liquid crystal as described in the foregoing embodiments. Here, examples of ink include general water-based inks and oil-based inks and also include various other liquid compositions such as gel inks and hot-melt inks.

K. Other Configuration

The present disclosure is not limited to the foregoing embodiments and can be implemented with various configurations within the scope not departing from the spirit. For example, the technical features of the embodiments corresponding to the technical features of the configurations described below can be replaced or combined as appropriate to solve some or all of the foregoing problems or to achieve some or all of the foregoing effects. Unless technical features are explained as essential ones in the present specification, they can be omitted as appropriate.

(1) A first aspect of the present disclosure provides a liquid ejecting apparatus. The liquid ejecting apparatus includes: a head unit including a first nozzle column including a plurality of nozzles aligned in a first direction, and a second nozzle column including a plurality of nozzles aligned in the first direction, the second nozzle column being located at a position away from the first nozzle column in a second direction intersecting the first direction, each nozzle of the first nozzle column being located at the same position in the first direction as the corresponding one of the nozzles of the second nozzle column; and a controller configured to control ejection operations of the head unit, and when a nozzle included in the first nozzle column is defined as a first nozzle, the nozzle included in the second nozzle column and located at the same position in the first direction as the first nozzle is defined as a second nozzle, a nozzle included in the first nozzle column and located at a position different in the first direction from the position of the first nozzle is defined as a third nozzle, and the nozzle included in the second nozzle column and located at the same position in the first direction as the third nozzle is defined as a fourth nozzle, the controller controls the ejection operations such that the number of ejection operations of the first nozzle is larger than the number of ejection operations of the second nozzle and the number of ejection operations of the fourth nozzle is larger than the number of ejection operations of the third nozzle. This configuration decreases the frequency with which a plurality of nozzles close to one another perform ejection operations at the same timing, reducing disturbance in air flow. Thus, it is possible to reduce degradation of image quality due to variation in the landing positions caused by the occurrence of turbulent air flows.

(2) In the above aspect, the controller may control the ejection operations so as not to use the second nozzle and the third nozzle. This configuration further decreases the frequency with which a plurality of nozzles close to one another perform ejection operations. Thus, it is possible to reduce disturbance in air flow and further reduce image quality degradation.

(3) In the above aspect, a configuration in which the first nozzle and the third nozzle are adjacent to each other in the first direction, and in which the second nozzle and the fourth nozzle are adjacent to each other in the first direction is possible. This configuration decreases the frequency with which two adjacent nozzles in the same column perform ejection operations. Thus, it is possible to reduce disturbance in air flow and further reduce image quality degradation.

(4) In the above aspect, when a nozzle included in the first nozzle column and adjacent to the third nozzle in the first direction is defined as a fifth nozzle, and a nozzle included in the second nozzle column and adjacent to the fourth nozzle in the first direction is defined as a sixth nozzle, the controller may control the ejection operations such that the number of ejection operations of the fifth nozzle is larger than the number of ejection operations of the sixth nozzle. This configuration decreases the frequency with which two adjacent nozzles in the same column perform ejection operations. Thus, it is possible to reduce disturbance in air flow and further reduce image quality degradation (5) In the above aspect, a configuration in which the first nozzle and the third nozzle are located at consecutive positions with a fifth nozzle in between in the first direction, and in which the second nozzle and the fourth nozzle are located at consecutive positions with a sixth nozzle in between in the first direction is possible. This configuration decreases the frequency with which all of three adjacent nozzles in the same column perform ejection operations. Thus, it is possible to reduce disturbance in air flow and further reduce image quality degradation.

(6) In the above aspect, the controller may control the ejection operations such that the number of ejection operations of the fifth nozzle is larger than the number of ejection operations of the sixth nozzle. This configuration decreases the frequency with which all of three adjacent nozzles in the same column perform ejection operations. Thus, it is possible to reduce disturbance in air flow and further reduce image quality degradation (7) In the above aspect, the head unit may further include a third nozzle column including a plurality of nozzles aligned in the first direction, the third nozzle column being located between the first nozzle column and the second nozzle column in the second direction, each nozzle of the third nozzle column being located at the same position in the first direction as the corresponding one of the nozzles of the first nozzle column, and when a nozzle included in the first nozzle column and located at a position different from the positions of the first nozzle and the third nozzle in the first direction is defined as a seventh nozzle, the nozzle included in the second nozzle column and located at the same position as the seventh nozzle in the first direction is defined as an eighth nozzle, the nozzle included in the third nozzle column and located at the same position as the first nozzle in the first direction is defined as a ninth nozzle, the nozzle included in the third nozzle column and located at the same position as the third nozzle in the first direction is defined as a tenth nozzle, and the nozzle included in the third nozzle column and located at the same position as the seventh nozzle in the first direction is defined as an eleventh nozzle, the controller may control the ejection operations such that the number of ejection operations of the first nozzle is larger than the number of ejection operations of each of the second nozzle and the ninth nozzle, the number of ejection operations of the fourth nozzle is larger than the number of ejection operations of each of the third nozzle and the tenth nozzle, and the number of ejection operations of the eleventh nozzle is larger than the number of ejection operations of each of the seventh nozzle and the eighth nozzle. This configuration decreases the frequency with which all of the nozzles in the same row of the three adjacent columns perform ejection operations. Thus, it is possible to reduce disturbance in air flow and further reduce image quality degradation.

(8) In the above aspect, the head unit may further include a third nozzle column including a plurality of nozzles aligned in the first direction, the third nozzle column being located between the first nozzle column and the second nozzle column in the second direction, each nozzle of the third nozzle column being located at the same position in the first direction as the corresponding one of the nozzles of the first nozzle column, and when a nozzle included in the first nozzle column and located at a position different from the positions of the first nozzle and the third nozzle in the first direction is defined as a seventh nozzle, the nozzle included in the second nozzle column and located at the same position as the seventh nozzle in the first direction is defined as an eighth nozzle, the nozzle included in the third nozzle column and located at the same position as the first nozzle in the first direction is defined as a ninth nozzle, the nozzle included in the third nozzle column and located at the same position as the third nozzle in the first direction is defined as a tenth nozzle, and the nozzle included in the third nozzle column and located at the same position as the seventh nozzle in the first direction is defined as an eleventh nozzle, the controller may control the ejection operations such that the number of ejection operations of the first nozzle is larger than the number of ejection operations of each of the second nozzle and the ninth nozzle, the number of ejection operations of the fourth nozzle is larger than the number of ejection operations of each of the third nozzle and the tenth nozzle, and the number of ejection operations of the seventh nozzle is larger than the number of ejection operations of each of the eighth nozzle and the eleventh nozzle. This configuration decreases the frequency with which all of the nozzles in the same row of the three adjacent columns perform ejection operations. Thus, it is possible to reduce disturbance in air flow and further reduce image quality degradation.

(9) In the above aspect, the controller, (i) when a distance between the head unit and a print medium is a first distance, may control the ejection operations such that the number of ejection operations of the first nozzle and the number of ejection operations of the second nozzle are substantially equal and the number of ejection operations of the third nozzle and the number of ejection operations of the fourth nozzle are substantially equal and, (ii) when the distance between the head unit and the print medium is a second distance larger than the first distance, may control the ejection operations such that the number of ejection operations of the first nozzle is larger than the number of ejection operations of the second nozzle and the number of ejection operations of the fourth nozzle is larger than the number of ejection operations of the third nozzle. With this configuration, when variation in the landing positions due to turbulent air flows is likely to occur, it is possible to change the number of ejection operations of each nozzle by using the distance between the head unit and the print medium.

(10) In the above aspect, the controller, (i) when a surface tension of liquid to be ejected from the head unit is a first value, may control the ejection operations such that the number of ejection operations of the first nozzle and the number of ejection operations of the second nozzle are substantially equal and the number of ejection operations of the third nozzle and the number of ejection operations of the fourth nozzle are substantially equal and, (ii) when the surface tension of the liquid to be ejected from the head unit is a second value smaller than the first value, may control the ejection operations such that the number of ejection operations of the first nozzle is larger than the number of ejection operations of the second nozzle and the number of ejection operations of the fourth nozzle is larger than the number of ejection operations of the third nozzle. With this configuration, when variation in the landing positions due to turbulent air flows is likely to occur, it is possible to change the number of ejection operations of each nozzle by using the surface tension of liquid to be ejected from the head unit.

(11) In the above aspect, the controller, (i) when the amount of ink to be ejected per nozzle of the head unit is a first amount, may control the ejection operations such that the number of ejection operations of the first nozzle and the number of ejection operations of the second nozzle are substantially equal and the number of ejection operations of the third nozzle and the number of ejection operations of the fourth nozzle are substantially equal and, (ii) when the amount of ink to be ejected per nozzle of the head unit is a second amount smaller than the first amount, may control the ejection operations such that the number of ejection operations of the first nozzle is larger than the number of ejection operations of the second nozzle and the number of ejection operations of the fourth nozzle is larger than the number of ejection operations of the third nozzle. With this configuration, when variation in the landing positions due to turbulent air flows is likely to occur, it is possible to change the number of ejection operations of each nozzle by using the amount of liquid to be ejected from the head unit.

The present disclosure can be implemented not only in the above aspect but also in other aspects such as an ejection method for a liquid ejecting apparatus, a computer program that implements the ejection method, and a non-transitory recording medium storing the computer program.

What is claimed is:

1. A liquid ejecting apparatus comprising:

a head unit including a first nozzle column including a plurality of nozzles aligned in a first direction, and a second nozzle column including a plurality of nozzles aligned in the first direction, the second nozzle column being located at a position away from the first nozzle column in a second direction intersecting the first direction, each nozzle of the first nozzle column being located at the same position in the first direction as the corresponding one of the nozzles of the second nozzle column; and a controller configured to control printing operations of the head unit, wherein when a nozzle included in the first nozzle column is defined as a first nozzle, the nozzle included in the second nozzle column and located at the same position in the first direction as the first nozzle is defined as a second nozzle, a nozzle included in the first nozzle column and located at a position different in the first direction from the position of the first nozzle is defined as a third nozzle, and the nozzle included in the second nozzle column and located at the same position in the first direction as the third nozzle is defined as a fourth nozzle, the controller is configured to control each printing operation based on a distance between the head unit and a print medium such that:

(i) when the distance between the head unit and the print medium is a first distance, the number of ejection operations of the first nozzle and the number of ejection operations of the second nozzle are substantially equal and the number of ejection operations of the third nozzle and the number of ejection operations of the fourth nozzle are substantially equal, and (ii) when the distance between the head unit and the print medium is a second distance larger than the first distance, the number of ejection operations of the first nozzle is larger than the number of ejection operations of the second nozzle and the number of ejection operations of the fourth nozzle is larger than the number of ejection operations of the third nozzle.

2. The liquid ejecting apparatus according to claim 1, wherein the first nozzle and the third nozzle are adjacent to each other in the first direction, and the second nozzle and the fourth nozzle are adjacent to each other in the first direction.

3. The liquid ejecting apparatus according to claim 1, wherein the first nozzle and the third nozzle are located at consecutive positions with a fifth nozzle in between in the first direction, and the second nozzle and the fourth nozzle are located at consecutive positions with a sixth nozzle in between in the first direction.

4. The liquid ejecting apparatus according to claim 3, wherein the controller controls each of the printing operations such that the number of ejection operations of the fifth nozzle is larger than the number of ejection operations of the sixth nozzle.

5. The liquid ejecting apparatus according to claim 1, wherein the head unit further includes a third nozzle column including a plurality of nozzles aligned in the first direction, the third nozzle column being located between the first nozzle column and the second nozzle column in the second direction, each nozzle of the third nozzle column being located at the same position in the first direction as the corresponding one of the nozzles of the first nozzle column, and when a nozzle included in the first nozzle column and located at a position different from the positions of the first nozzle and the third nozzle in the first direction is defined as a seventh nozzle, the nozzle included in the second nozzle column and located at the same position as the seventh nozzle in the first direction is defined as an eighth nozzle, the nozzle included in the third nozzle column and located at the same position as the first nozzle in the first direction is defined as a ninth nozzle, the nozzle included in the third nozzle column and located at the same position as the third nozzle in the first direction is defined as a tenth nozzle, and the nozzle included in the third nozzle column and located at the same position as the seventh nozzle in the first direction is defined as an eleventh nozzle, the controller controls each of the printing operations such that the number of ejection operations of the first nozzle is larger than the number of ejection operations of each of the second nozzle and the ninth nozzle, the number of ejection operations of the fourth nozzle is larger than the number of ejection operations of each of the third nozzle and the tenth nozzle, and the number of ejection operations of the eleventh nozzle is larger than the number of ejection operations of each of the seventh nozzle and the eighth nozzle.

6. The liquid ejecting apparatus according to claim 1, wherein the head unit further includes a third nozzle column including a plurality of nozzles aligned in the first direction, the third nozzle column being located between the first nozzle column and the second nozzle column in the second direction, each nozzle of the third nozzle column being located at the same position in the first direction as the corresponding one of the nozzles of the first nozzle column, and when a nozzle included in the first nozzle column and located at a position different from the positions of the first nozzle and the third nozzle in the first direction is defined as a seventh nozzle, the nozzle included in the second nozzle column and located at the same position as the seventh nozzle in the first direction is defined as an eighth nozzle, the nozzle included in the third nozzle column and located at the same position as the first nozzle in the first direction is defined as a ninth nozzle, the nozzle included in the third nozzle column and located at the same position as the third nozzle in the first direction is defined as a tenth nozzle, and the nozzle included in the third nozzle column and located at the same position as the seventh nozzle in the first direction is defined as an eleventh nozzle, the controller controls each of the printing operations such that the number of ejection operations of the first nozzle is larger than the number of ejection operations of each of the second nozzle and the ninth nozzle, the number of ejection operations of the fourth nozzle is larger than the number of ejection operations of each of the third nozzle and the tenth nozzle, and the number of ejection operations of the seventh nozzle is larger than the number of ejection operations of each of the eighth nozzle and the eleventh nozzle.

7. A liquid ejection method for a liquid ejecting apparatus including a head unit including a first nozzle column including a plurality of nozzles aligned in a first direction, and a second nozzle column including a plurality of nozzles aligned in the first direction, the second nozzle column being located at a position away from the first nozzle column in a second direction intersecting the first direction, each nozzle of the first nozzle column being located at the same position in the first direction as the corresponding one of the nozzles of the second nozzle column, wherein when a nozzle included in the first nozzle column is defined as a first nozzle, the nozzle included in the second nozzle column and located at the same position in the first direction as the first nozzle is defined as a second nozzle, a nozzle included in the first nozzle column and located at a position different in the first direction from the position of the first nozzle is defined as a third nozzle, and the nozzle included in the second nozzle column and located at the same position in the first direction as the third nozzle is defined as a fourth nozzle, the liquid ejection method comprises:

controlling each printing operation of the head unit based on a distance between the head unit and a print medium such that:

(i) when the distance between the head unit and the print medium is a first distance, the number of ejection operations of the first nozzle and the number of ejection operations of the second nozzle are substantially equal and the number of ejection operations of the third nozzle and the number of ejection operations of the fourth nozzle are substantially equal, and (ii) when the distance between the head unit and the print medium is a second distance larger than the first distance, the number of ejection operations of the first nozzle is larger than the number of ejection operations of the second nozzle and the number of ejection operations of the fourth nozzle is larger than the number of ejection operations of the third nozzle.

* * * * *